US012415753B2

(12) United States Patent
Paul (10) Patent No.: US 12,415,753 B2
(45) Date of Patent: Sep. 16, 2025

(54) WASTEWATER TREATMENT SYSTEM AND METHOD FOR PRODUCING SLUDGE FOR CEMENT MANUFACTURING

(71) Applicant: Alden Group Environmental Solutions, LLC, The Woodlands, TX (US)

(72) Inventor: William Paul, Bucyrus, KS (US)

(73) Assignee: Alden Group Environmental Solutions, LLC, The Woodlands, TX (US)

( * ) Notice: Subject to any disclaimer, the term of this patent is extended or adjusted under 35 U.S.C. 154(b) by 744 days.

(21) Appl. No.: 17/588,636

(22) Filed: Jan. 31, 2022

(65) Prior Publication Data

US 2022/0153642 A1  May 19, 2022

Related U.S. Application Data

(63) Continuation-in-part of application No. 16/944,673, filed on Jul. 31, 2020.
(Continued)

(51) Int. Cl.
*C04B 7/24* (2006.01)
*C02F 1/52* (2023.01)
(Continued)

(52) U.S. Cl.
CPC .............. *C04B 7/24* (2013.01); *C02F 1/5245* (2013.01); *C02F 1/5263* (2013.01); *C02F 1/56* (2013.01);
(Continued)

(58) Field of Classification Search
CPC . C04B 7/24; C04B 7/40; C02F 11/145; C02F 1/5245; C02F 1/5263; C02F 1/56;
(Continued)

(56) References Cited

FOREIGN PATENT DOCUMENTS

CN          100371271 C  *  2/2008
WO   WO-2017178356 A1  * 10/2017 .............. C02F 1/004

OTHER PUBLICATIONS

Machine Translation of CN 100371271 C. (Year: 2006).*
(Continued)

*Primary Examiner* — Coris Fung
*Assistant Examiner* — Catriona M Corallo
(74) *Attorney, Agent, or Firm* — Hovey Williams LLP; Paul J. Walker (57) ABSTRACT

A wastewater treatment system, including a wastewater phase-separation device, may be used to combine at least one primary treatment chemical and wastewater to produce cleaned water and a sludge byproduct. The wastewater treatment system may also include a wastewater dewatering device that may be used to combine the sludge byproduct and at least one secondary treatment chemical to produce a Medium to High Solids Content Sludge without excess water. A method for producing sludge for cement manufacturing may include combining wastewater and at least one primary treatment chemical to form a liquid phase and a solid phase, where the liquid phase includes clean water and the solid phase includes a sludge byproduct, separating the liquid phase from the solid phase, combining the solid phase with at least one secondary treatment chemical to form an intermediate that contains excess water, and removing the excess water from the intermediate to form a Medium to High Solids Content Sludge.

10 Claims, 2 Drawing Sheets

Related U.S. Application Data (60) Provisional application No. 62/880,823, filed on Jul. 31, 2019.

(51) Int. Cl.
  *C02F 1/56* (2023.01)
  *C02F 11/145* (2019.01)
  *C04B 7/40* (2006.01)
  *C02F 103/16* (2006.01)
  *C02F 103/28* (2006.01)
  *C02F 103/34* (2006.01)

(52) U.S. Cl.
  CPC .............. *C02F 11/145* (2019.01); *C04B 7/40* (2013.01); *C02F 2103/16* (2013.01); *C02F 2103/28* (2013.01); *C02F 2103/34* (2013.01)

(58) Field of Classification Search
  CPC .............. C02F 2103/16; C02F 2103/28; C02F 2103/34
  USPC ........................................................ 106/605
  See application file for complete search history.

(56) References Cited

OTHER PUBLICATIONS

Bourliva et al. "Municipal wastewater treatment with bentonite from Milos Island, Greece". Bulletin of the Geological Society of Greece, 2010, p. 2532-2539. (Year: 2010).*

* cited by examiner

WASTEWATER TREATMENT SYSTEM AND METHOD FOR PRODUCING SLUDGE FOR CEMENT MANUFACTURING

RELATED APPLICATIONS

This application is a Continuation-in-Part of U.S. patent application Ser. No. 16/944,673, filed on Jul. 31, 2020, and which claims the priority benefit under 35 U.S.C. § 119(e) of U.S. Provisional Patent Application Ser. No. 62/880,823 entitled "Systems and Methods for Treating Wastewater for the Production of Sludge for Cement Manufacturing," filed Jul. 31, 2019, the entire disclosures of both these priority documents are incorporated herein by reference.

BACKGROUND

Wastewater treatment systems and technologies are well known, with many focusing on the treatment of wastewater for various forms of water reuse or water discharge. While conventional wastewater treatment plants convert wastewater to water suitable for discharge or reuse, such plants may produce a sludge byproduct. Sludge byproduct contains waste solids and contaminants, such as metals that must be removed for the water to be suitable for reuse or discharge. This process may use coagulation and flocculation to separate water from a wide range of contaminants, many in the form of waste solids. In many such conventional wastewater treatment facilities, the sludge byproduct may be directly disposed in landfills, such as via injection or slurry wells, may be used in land applications, or may be destroyed in incinerators, thermal desorption, or thermal dries.

SUMMARY

A wastewater treatment system includes a wastewater phase-separation device that combines at least one primary treatment chemical and wastewater to produce cleaned water and a sludge byproduct and a wastewater dewatering device that combines the sludge byproduct and at least one secondary treatment chemical to produce a Medium to High Solids Content Sludge and remove excess water. A method for producing sludge includes combining wastewater and at least one primary treatment chemical to form a liquid phase and a solid phase, wherein the liquid phase is made up of clean water and the solid phase is made up of a sludge byproduct, separating the liquid phase from the solid phase, combining the solid phase with at least one secondary treatment chemical to form an intermediate, the intermediate containing excess water, and removing the excess water from the intermediate to form a Medium to High Solids Content Sludge.

BRIEF DESCRIPTION OF THE FIGURES

Embodiments of the present invention are described herein with reference to the following drawing figures, wherein.

DETAILED DESCRIPTION OF THE EMBODIMENTS

Embodiments of the disclosure provide a system and method for treating wastewater and conditioning wastewater sludge byproduct to produce a product that may be used in cement production.

Figure 1:
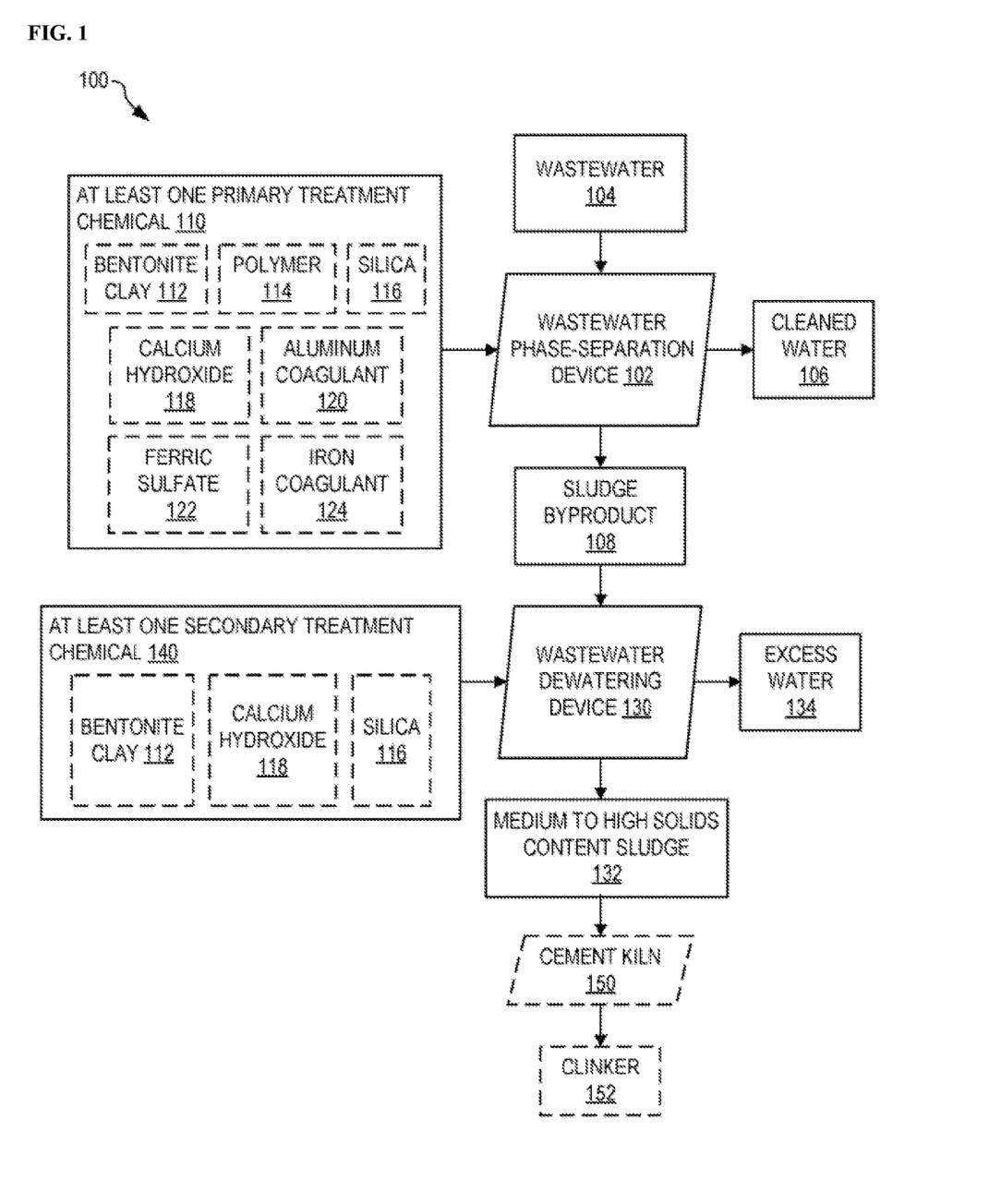
FIG. 1 illustrates one wastewater treatment system that includes a wastewater phase-separation device and a wastewater dewatering device that are used to form a Medium to High Solids Content Sludge.

FIG. 1 illustrates one wastewater treatment system 100 that includes wastewater phase-separation device 102 and a wastewater dewatering device 130 that are used to form a Medium to High Solids Content Sludge 132. As used herein, a "Medium to High Solids Content Sludge" refers to a sludge derived from wastewater that comprises a solids content in the range of 20 to 70 weight percent, based on the total weight of the sludge.

Turning back to FIG. 1, the wastewater treatment system 100 combines wastewater 104 with at least one primary treatment chemical 110 to form cleaned water 106 and a sludge byproduct 108. Generally, the sludge byproduct 108 may comprise a solids content of at least 1, 2, 3, 4, or 5 weight percent and/or less than 20, 15, 14, 13, 12, 11, or 10 weight percent, based on the total weight of the sludge byproduct 108.

The wastewater dewatering device 130 may then combine the sludge byproduct 108 with at least one secondary treatment chemical 140 to thereby form the Medium to High Solids Content Sludge 132 and excess water 134. Generally, the Medium to High Solids Content Sludge 132 may comprise a solids content of at least 20, 25, 30, 35, or 40 weight percent and/or less than 70, 65, 60, or 55 weight percent, based on the total weight of the Medium to High Solids Content Sludge 132.

In various embodiments, the primary treatment chemical 110 may include, or may be chosen from a group that includes, one or more of bentonite clay 112, polymer 114 (e.g., a cationic polymer and/or an anionic polymer), silica 116, calcium hydroxide 118 (e.g., lime), aluminum coagulant 120 (e.g., aluminum chlorohydrate, aluminum chloride, and/or aluminum sulfate), ferric sulfate 122, and iron coagulant 124 (e.g., ferrous chloride, ferrous sulfate, and/or ferric chloride). Generally, in one or more embodiments, the primary treatment chemical comprises bentonite clay.

In various embodiments, the secondary treatment chemical 140 may include, or may be chosen from a group that includes, one or more of bentonite clay 112, calcium hydroxide 118, and silica 116. Generally, in one or more embodiments, the secondary treatment chemical comprises bentonite clay.

Turning again to FIG. 1, in some embodiments, the Medium to High Solids Content Sludge may be heated in a cement kiln 150 to form a sustainable clinker 152, which may be used in cement manufacturing as described below. As used herein, the term "sustainable clinker" refers to a clinker at least partially derived from wastewater sludge from one or more wastewater streams.

In some embodiments, the wastewater treatment system 100 includes multiple stages, such as a pre-treatment stage, a solids separation stage performed in the wastewater phase-separation device 102, a solids concentration stage performed in the wastewater dewatering device 130, and a post-treatment stage. All of these various steps are discussed in greater detail below.

Generally, in various embodiments, the pre-treatment stage includes processes to facilitate the solids to be removed and filtered more easily.

The solids separation stage may involve the separation of two phases (e.g., solid and liquid) from a suspension to thereby yield a liquid phase and a solid component. During the separation stage, the wastewater phase-separation device 102 may recover at least a portion of the solid component, which may be processed into the Medium to High Solids Content Sludge 132, for use in manufacturing of construction materials (e.g., cement). Meanwhile, the liquid phase, which can include the cleaned water 106, may be discarded or reused.

The wastewater phase-separation device 102 may include one or more of a filter press, a vacuum drum, a belt press, a fan press, a band filter, a dewatering box centrifuge, a screw press, a batch tank reactor, an auto sequential batch unit, a continuous flow unit, a dissolved air flotation (DAF), an induced air floatation (IAF) round, a rectangle gravity clarifier, a thickener, and/or an angle plate lamella clarifier.

In the solids concentration stage, the wastewater dewatering device 130 may at least partially dewater the solid component (e.g., the sludge byproduct 108 obtained from the wastewater phase-separation device 102). In this stage, a portion (or all) of the remaining liquid, which may be referred to herein as excess water 134, may be removed, for example, via a device or process utilizing gravity, via mechanical thickening in which a liquid volume throughput load may be reduced, and/or another like process. The wastewater dewatering device 130 may be or include one or more of a filter press, a vacuum drum, a belt press, a fan press, a band filter, a dewatering box centrifuge, a screw press, a batch tank reactor, an auto sequential batch unit, a thickener, a continuous flow unit, a DAF, an IAF round, a rectangle gravity clarifier, and/or an angle plate lamella clarifier.

As is further described herein, the solids separation stage may involve changing the nature of the suspended solids by chemical means, such as by adding at least one primary treatment chemical 110 to the wastewater phase-separation device 102. In various implementations, the chemical means used in the solids separation stage may include one or more of bentonite clay 112, polymer 114 (e.g., a cationic polymer and/or an anionic polymer), silica 116, calcium hydroxide 118, aluminum coagulant 120, ferric sulfate 122, and/or iron coagulant 124.

Likewise, the solid concentration stage in the wastewater dewatering device 130 may involve changing the nature of the sludge byproduct 108 by chemical means, such as by adding at least one secondary treatment chemical 140 to the wastewater dewatering device 130. In various implementations, the chemical means used in the solid concentration stage may include one or more of bentonite clay 112, calcium hydroxide 118, and/or silica 116. Generally, the added chemical materials may act as one or more bulking agents to increase the permeability of the cake formed during subsequent filtration or dewatering.

Generally, wastewater 104 is evaluated based on the content, concentration, volume, molar ratio, weight percentage, and other like measures of one or more substances in the wastewater (e.g., iron, aluminum, silica, and/or calcium compounds). The levels of these substances in the wastewater 104 may be related to the levels of inorganic solids retained in the resultant Medium to High Solids Content Sludge byproduct 132, and thus the levels of inorganic solids in Medium to High Solids Content Sludge 132 may vary in accordance with different types of wastewater 104. As used herein, an "inorganic solid" refers to a solid formed from any inorganic compound or element that does not contain carbon.

In various embodiments, the wastewater 104 may contain less than 15, 14, 13, 12, 11, 10, 9, 8, 7, 6, 5, 4, 3, 2, or 1 total weight percent (wt %) of one or more inorganic solids, based on the total weight of the wastewater stream. Additionally, or in the alternative, the wastewater 104 may contain at least 0.1, 0.5, 1, 2, 3, 4, or 5 total weight percent of one or more inorganic solids, based on the total weight of the wastewater stream. Exemplary inorganic solids can comprise aluminum-containing solids (e.g., aluminum oxide, aluminum metals, aluminum chloride, aluminum chlorohydrate, aluminum chloride, aluminum sulfate, and/or other aluminum salts), iron-containing solids (iron oxide, iron sulfate, ferrous chloride, iron metals, ferric chloride, and/or other iron salts), silica-containing solids (e.g., colloidal silica, silicates, and/or silica), calcium-containing solids (e.g., calcium carbonate, calcium hydroxide, lime, and/or other calcium salts), or a combination thereof. These inorganic solids may be removed from the wastewater 104 through phase separation using the wastewater phase-separation device 102.

The wastewater 104 may be obtained from a number of different sources, which can greatly affect the chemical portfolio of the resulting wastewater 104. For example, the wastewater 104 may be derived from a flexographic ink facility that produces inks, a metal stamping facility (e.g., a facility that produces aluminum cans), a paper manufacturing facility (e.g., corrugated packaging facility), a die-casting facility (e.g., a facility for die casting with zinc, aluminum, and/or ion), or any other facilities that provides a wastewater enriched in chemicals and minerals that are desirable for downstream clinker production.

The chemical profile analysis of a raw wastewater stream, from which wastewater 104 may be taken, may indicate which of the multiple inorganic constituents is, for example, of the highest level in the sampled wastewater 104. Optionally, the wastewater treatment system 100 may be optimized to target an inorganic constituent having the highest presence in the wastewater (or, e.g., having a level that exceeds a corresponding threshold). Such a process to target inorganic constituents may facilitate successful solids treatment of the waste from the wastewater using high-performance phase separation. Once the resultant sludge byproduct 108 is separated and dewatered to form the Medium to High Solids Content Sludge 132, the resulting Medium to High Solids Content Sludge 132 may contain up to 50 weight percent of the targeted inorganic constituent.

In various embodiments, the sludge byproduct 108 may contain at least 1, 2, 3, 4, 5, 6, 7, 8, 9, 10, 15, or 20 weight percent of one or more inorganic solids, based on the total weight of the sludge byproduct. Additionally, or in the alternative, the sludge byproduct 108 may contain less than 70, 65, 60, 55, 50, 49, 48, 47, 46, 45, 40, 35, 30, 25, 20, 15, 10, or 5 weight percent of one or more inorganic solids, based on the total weight of the sludge byproduct. These inorganic solids can comprise aluminum-containing solids (e.g., aluminum oxide, aluminum metals, aluminum chloride, aluminum chlorohydrate, aluminum chloride, aluminum sulfate, and/or other aluminum salts), iron-containing solids (iron oxide, iron sulfate, ferrous chloride, iron metals, ferric chloride, and/or other iron salts), silica-containing solids (e.g., colloidal silica, silicates, and/or silica), calcium-containing solids (e.g., calcium carbonate, calcium hydroxide, lime, and/or other calcium salts), or a combination thereof. It should be noted that the above weight percent ranges may apply to these inorganic solid types individually or in any combination.

In various embodiments, the Medium to High Solids Content Sludge 132 may contain at least 1, 2, 3, 4, 5, 6, 7, 8, 9, 10, 15, 20, 25, 30, 35, 45, or 50 weight percent of one or more inorganic solids, based on the total weight of the Medium to High Solids Content Sludge. Additionally, or in the alternative, the Medium to High Solids Content Sludge 132 may contain less than 70, 65, 60, 55, 50, 49, 48, 47, 46, 45, 40, 35, 30, 25, 20, 15, 10, or 5 weight percent of one or more inorganic solids, based on the total weight of the Medium to High Solids Content Sludge. These inorganic solids can comprise aluminum-containing solids (e.g., aluminum oxide, aluminum metals, aluminum chloride, aluminum chlorohydrate, aluminum chloride, aluminum sulfate, and/or other aluminum salts), iron-containing solids (iron oxide, iron sulfate, ferrous chloride, iron metals, ferric chloride, and/or other iron salts), silica-containing solids (e.g., colloidal silica, silicates, and/or silica), calcium-containing solids (e.g., calcium carbonate, calcium hydroxide, lime, and/or other calcium salts), or a combination thereof. It should be noted that the above weight percent ranges may apply to these inorganic solid types individually or in any combination.

Prior to further treatment, the pH value of the wastewater 104 may be adjusted for a relatively more precise contaminate downstream removal process via the wastewater phase-separation device 102. Additionally, or in the alternative, the pH value of the sludge byproduct 108 may also be adjusted for relatively more precise downstream contaminate removal via the wastewater dewatering device 130. The pH value corresponds to the acidity or alkalinity of a solution on a logarithmic scale on which 7 is neutral, lower values represent fluids being more acidic, and higher values represent fluids being more alkaline. The pH is equal to $-\log_{10} C$, where C is the hydrogen ion concentration in moles per liter. Exemplary pH adjustment compounds and minerals may be or include at least one of aluminum chlorohydrate, aluminum chloride, aluminum sulfate, calcium hydroxide, lime, ferrous chloride, ferrous sulfate, ferric chloride, and/or ferric sulfate. In various embodiments, one or more of the pH adjustment compounds may be added in amounts effective to adjust the pH of the wastewater 104, as desired to generate clean water 106, and/or the sludge byproduct 108.

In various embodiments, the wastewater 104 may comprise at least 0.01, 0.05, 0.1, 0.2, or 0.3 weight percent of one or more pH adjustment compounds, based on the total weight of the wastewater. Additionally, or in the alternative, the wastewater 104 may comprise less than 5, 4, 3, 2, or 1 weight percent of one or more pH adjustment compounds, based on the total weight of the wastewater.

In various embodiments, the sludge byproduct 108 may comprise at least 0.1, 0.5, 1, 2, or 3 weight percent of one or more pH adjustment compounds, based on the total weight of the sludge byproduct. Additionally, or in the alternative, the sludge byproduct 108 may comprise less than 5, 4, 3, 2, or 1 weight percent of one or more pH adjustment compounds, based on the total weight of the sludge byproduct.

Turning back to FIG. 1, while in the wastewater phase-separation device 102, the wastewater 104 may be mixed with effective amounts of at least one primary treatment chemical 110 to reach a particular pH at which the wastewater 104 achieves solid-liquid separation. The choice of at least one primary treatment chemical 110 may be based on the chemical profile of the wastewater 104 (e.g., the constituents of the wastewater 104 and/or other metrics). In some embodiments, treatment of the wastewater 104 may include the addition of bentonite clay 112, polymer 114 (e.g., a cationic polymer and/or an anionic polymer), silica 116, calcium hydroxide 118, aluminum coagulant 120, ferric sulfate 122, and/or iron coagulant 124 in order to condition the wastewater 104 such that the cleaned water 106 and sludge byproduct 108 each has one or more desired characteristics, thereby indicating a successful treatment.

In various embodiments, treatment of the wastewater 104 may include the use of only bentonite clay 112, polymer 114 (e.g., a cationic polymer and/or an anionic polymer), silica 116, calcium hydroxide 118, aluminum coagulant 120, ferric sulfate 122, or iron coagulant 124. Alternatively, in various embodiments, the wastewater 104 may require the use of a combination of bentonite clay 112, polymer 114 (e.g., cationic polymer and/or an anionic polymer), silica 116, calcium hydroxide 118, aluminum coagulant 120, ferric sulfate 122, and iron coagulant 124.

Generally, the effective amount of each of the at least one primary treatment chemical 110 utilized for treatment is based on the chemical formulation of the wastewater 104. In various embodiments, each of the primary treatment chemicals 110 may be added individually or in certain combinations to the wastewater 104 in sufficient amounts so that the treated wastewater 104 comprises in the range of about 1 to about 25 weight percent of one or more primary treatment chemicals, based on the total weight of the solids in the wastewater 104. As noted above, the type of primary treatment chemicals 110 may be selected based on the profile of the wastewater 104. In some embodiments, the effective amount of each of the primary treatment chemicals 110 may be from about 1 to about 15 weight percent, from about 1 to about 10 weight percent, or from about 1 to about 5 weight percent of the total weight of the solids in the wastewater 104. In one or more embodiments, about 1 to about 15 weight percent of at least one type of a primary treatment chemical 110 is added to the wastewater stream (e.g., bentonite clay) and about 1 to about 5 weight percent of another type of primary treatment chemical 110 (e.g., calcium hydroxide) is added to the wastewater 104. Other amounts of the primary treatment chemicals may be used without departing from the scope hereof.

In various embodiments, one or more primary treatment chemicals can be added to the wastewater 104 in sufficient quantities so that the resulting treated wastewater comprises at least 0.1, 0.5, 1, 2, 3, or 4 weight percent of one or more of the primary treatment chemicals, based on the total weight of the solids in the wastewater. Additionally, or in the alternative, one or more primary treatment chemicals can be added to the wastewater 104 in sufficient quantities so that the resulting treated wastewater comprises less than 25, 20, 15, 10, 9, 8, 7, 6, 5, 4, 3, or 2 weight percent of one or more of the primary treatment chemicals, based on the total weight of the solids in the wastewater. The aforementioned weight percentages are based on the total weight of solids in the treated wastewater. It should be noted that these weight percent ranges may apply to each of the individual primary treatment chemicals or combined quantities thereof As shown in FIG. 1, after the phase separation occurs in the wastewater phase-separation device 102, the cleaned water 106 may be suitable for discharge or reuse. In such cases, the separated sludge byproduct 108 may then be conveyed, containerized, and transported to the wastewater dewatering device 130. Alternatively, in certain embodiments, the wastewater phrase-separation device 102 may be in fluid communication with the wastewater dewatering device 130. As used herein, "fluid communication" refers to devices and/or systems in which at least a portion of the process streams and/or supporting equipment are shared between the two devices and/or systems.

In the wastewater dewatering device 130, the sludge byproduct 108 may be mixed with at least one secondary treatment chemical 140. The choice of the secondary treatment chemical 140 may be based on the chemical profile of the sludge byproduct 108. In some embodiments, further treatment of the sludge byproduct 108 may include the use of bentonite clay 112, calcium hydroxide 118, and/or silica 116 so as to condition the Medium to High Solids Content Sludge 132 to have the desired characteristics for use in the production of construction materials.

In various embodiments, further treatment of the sludge byproduct 108 may include the use of only one of bentonite clay 112, calcium hydroxide 118, or silica 116. In some embodiments, further treatment may include the use of a combination of bentonite clay 112, calcium hydroxide 118, and/or silica 116. The effective amount of each of the secondary treatment chemicals 140 utilized for further treatment of the sludge byproduct 108 may be based on the chemical profile of the sludge byproduct 108. In one or more embodiments, each of the secondary treatment chemicals 140 may be added individually or in certain combinations to the sludge byproduct 108 so that the treated sludge 108 comprises in the range of about 1 to about 25 weight percent of one or more secondary treatment chemicals, based on the total weight of solids in the sludge byproduct 108.

As noted above, the type of secondary treatment chemicals 140 may be selected based on the chemical profile of the sludge byproduct 108. In some embodiments, the effective amount of each of the at least one secondary treatment chemical 140 may be from about 1 to about 15 weight percent, from about 1 to about 10 weight percent, or from about 1 to about 5 weight percent of the total weight of the solids in the sludge byproduct 108. In one or more embodiments, about 1 to about 15 weight percent of at least one type of a secondary treatment chemical 140 is added to the sludge byproduct 108 (e.g., bentonite clay) and about 1 to about 5 weight percent of another type of secondary treatment chemical 140 (e.g., calcium hydroxide) is added to the sludge byproduct 108. Both of these weight percentages are based on the total weight of solids in the sludge byproduct 108. Other amounts of the secondary treatment chemicals may be used without departing from the scope hereof.

In various embodiments, one or more secondary treatment chemicals can be added to the sludge byproduct 108 in sufficient quantities so that the resulting treated sludge byproduct 108 comprises at least 0.1, 0.5, 1, 2, 3, or 4 weight percent of one or more of the secondary treatment chemicals, based on the total weight of the solids in the sludge byproduct 108. Additionally, or in the alternative, one or more secondary treatment chemicals can be added to the sludge byproduct 108 in sufficient quantities so that the resulting treated sludge byproduct 108 comprises less than 25, 20, 15, 10, 9, 8, 7, 6, 5, 4, 3, or 2 weight percent of one or more of the secondary treatment chemicals, based on the total weight of the solids in the sludge byproduct 108. It should be noted that these weight percent ranges may apply to each of the individual secondary treatment chemicals or combined quantities thereof.

After exiting the wastewater dewatering device 130, the resulting Medium to High Solids Content Sludge 132 from the wastewater dewatering device 130 may be heated at high temperatures in a cement kiln 150 to produce grayish-black pellets, such as clinker 152, which may be suitable for producing cement. The kiln 150 may operate at a temperature in the range of 2,500° F. to 2,800° F., generally about 2,600° F., to produce the clinker 152. The kiln 150 can be any conventional cement kiln known in the art, such as a rotary kiln.

In various embodiments, the resulting clinker 152 may be formed from solid particulates of various sizes that are derived entirely from the Medium to High Solids Content Sludge 132. In one or more embodiments, at least 75, 80, 85, 90, 95, or 99 weight percent of the solids in the clinker 152 may be derived from the Medium to High Solids Content Sludge 132, based on the total weight of the clinker. In certain embodiments, all of the solids forming the clinker 152 can be derived from the Medium to High Solids Content Sludge 132.

In various embodiments, the resulting clinker 152 may contain at least 10, 15, 20, 25, 30, 35, 40, 45, 50, 55, 60, 65, 70, 75, 80, 85, 90, or 95 weight percent of one or more inorganic solids, based on the total weight of the clinker. Additionally, or in the alternative, the resulting clinker 152 may contain less than 99, 98, 95, 90, 85, 80, 75, 70, 65, 60, or 55 weight percent of one or more inorganic solids, based on the total weight of the clinker. These inorganic solids can be in the form of particulates of various sizes and can comprise aluminum-containing solids (e.g., aluminum oxide, aluminum metals, aluminum chloride, aluminum chlorohydrate, aluminum chloride, aluminum sulfate, and/or other aluminum salts), iron-containing solids (iron oxide, iron sulfate, ferrous chloride, iron metals, ferric chloride, and/or other iron salts), silica-containing solids (e.g., colloidal silica, silicates, and/or silica), calcium-containing solids (e.g., calcium carbonate, calcium hydroxide, lime, and/or other calcium salts), or a combination thereof. It should be noted that the above weight percent ranges may apply to these inorganic solid types individually or in any combination.

Furthermore, unlike other clinkers available in today's market, the sustainable clinker 152 may comprise residual wastewater byproducts derived from the wastewater itself and/or the wastewater treatment methods described herein. In certain situations, these residual wastewater byproducts may enhance or facilitate the functional properties of the clinker 152. As used herein, "wastewater byproducts" refer to solids directly or indirectly derived from wastewater and/or wastewater treatment methods. For example, these wastewater byproducts can include any of the primary treatment chemicals and/or the secondary treatment chemicals added during the wastewater treatment steps. In one or more embodiments, the wastewater byproducts can be derived entirely from the Medium to High Solids Content Sludge 132. Generally, in various embodiments, the resulting sustainable clinker 152 comprises at least 75, 80, 85, 90, 95, or 99 weight percent of wastewater byproducts. In certain embodiments, the sustainable clinker 152 is formed entirely from wastewater byproducts.

According to various embodiments described herein, a coagulation process may be used to produce the sludge byproduct 108 and/or the Medium to High Solids Content Sludge 132. Generally, coagulation may include the addition of at least one primary treatment chemical 110 to the wastewater 104, which clumps the small and destabilized particles within the wastewater 104 together to form larger aggregates. Subsequently, these larger aggregates may be more easily separated and recovered in the wastewater phase-separator 102.

Additionally, in various embodiments, the treatment processes described herein may utilize both coagulation and flocculation. Coagulation destabilizes particles through chemical reactions between the coagulant and colloids, and flocculation transports the destabilized particles that will cause collisions with floc. Generally, coagulation is a process that relies on neutralization of charges. Flocculation, on the other hand, is a physical process in which colloids come out of suspension in the form of floc, either spontaneously or due to the addition of a clarifying polymer agent. These polymer agents may have both anionic and cationic charge characteristics. The flocculation action differs from precipitation in that, prior to flocculation, colloids are merely suspended in a liquid and not actually dissolved in a solution. In the flocculated system, there is no formation of a cake, since all the flocs are in the suspension.

Coagulation involves using one or more compounds, including but not limited to aluminum chlorohydrate, aluminum chloride, aluminum sulfate, calcium hydroxide, lime, ferrous chloride, ferrous sulfate, ferric chloride, ferric sulfate, and/or bentonite clay (i.e., a potassium, sodium, calcium, and aluminum composition). As noted above, these coagulation agents may be added as the primary treatment and/or the secondary treatment chemical in the aforementioned weight percent ranges. The combined coagulation and flocculation process may be used as a preliminary step, or an intermediary step performed by at least one of the wastewater phase-separation device 102 and/or the wastewater dewatering device 130.

In various embodiments, a process for treating wastewater 104 may include using chemicals to produce a desired condition in the Medium to High Solids Content Sludge 132 so that it may be more suitable for manufacturing cement products due to its mineral contents. Exemplary cement products that may be produced with the Medium to High Solids Content Sludge 132 may include one or more of Portland cement, pozzolana cement, rapid hardening cement, quick setting cement, low heat cement, sulphate resisting cement, blast furnace slag cement, high alumina cement, white cement, colored cement, air entraining cement, expansive cement, hydrographic cement, hydrophobic cement, super sulfate cement, low alkali cement, polymer cement, calcium sulfoaluminate cement, and/or natural cement. Other cement products may be generated without departing from the teachings herein.

In various embodiments, the techniques described herein provide a process of wastewater treatment and sludge disposal that utilizes the Medium to High Solids Content Sludge 132 to manufacture Portland cement. Portland cement gets its strength from a hydration process where some complex chemical reactions take place between cement and water. Generally, Portland cement may be manufactured according to the following steps. Firstly, lime, calcium, silica, alumina, iron, and/or other minerals or compounds are crushed, milled, and proportionated. These materials, without gypsum, are proportioned to produce a mixture with a desired chemical composition. These substances are then ground and blended in either a dry process or a wet process. Afterwards, the materials are fed through a kiln at a temperature in the range of 2,500° F. to 2,800° F., generally about 2,600° F., to produce clinker. During this step, the alumina and iron may act as fluxing agents and may lower the melting point of the silica from 3,000° F. to 2,600° F. The clinker is then cooled and pulverized, and gypsum is added to regulate setting time. Lastly, the clinker is ground extremely fine to produce cement. This process may be used with clinker 152 generated using wastewater treatment system 100.

As noted above, various types of cement products may be produced using the clinker formed from the Medium to High Solids Content Sludge 132 described herein. In various embodiments, one or more cement products, including any of those previously listed, may be produced with the clinker formed from the Medium to High Solids Content Sludge 132 so that that the resulting cement product comprises at least 1, 5, 10, 15, 20, 25, 30, 35, 40, 45, 50, 55, 60, 65, 70, 75, 80, 85, 90, or 95 weight percent of sustainable clinker derived from the Medium to High Solids Content Sludge 132, based on the total weight of the cement product. Additionally, or in the alternative, the one or more cement products, including any of those previously listed, may be produced with the sustainable clinker formed from the Medium to High Solids Content Sludge 132 so that that the resulting cement product comprises less than 99, 95, 90, 85, 85, 75, 70, 65, 60, 55, 50, or 45 weight percent of clinker derived from the Medium to High Solids Content Sludge 132, based on the total weight of the cement product.

Figure 2:
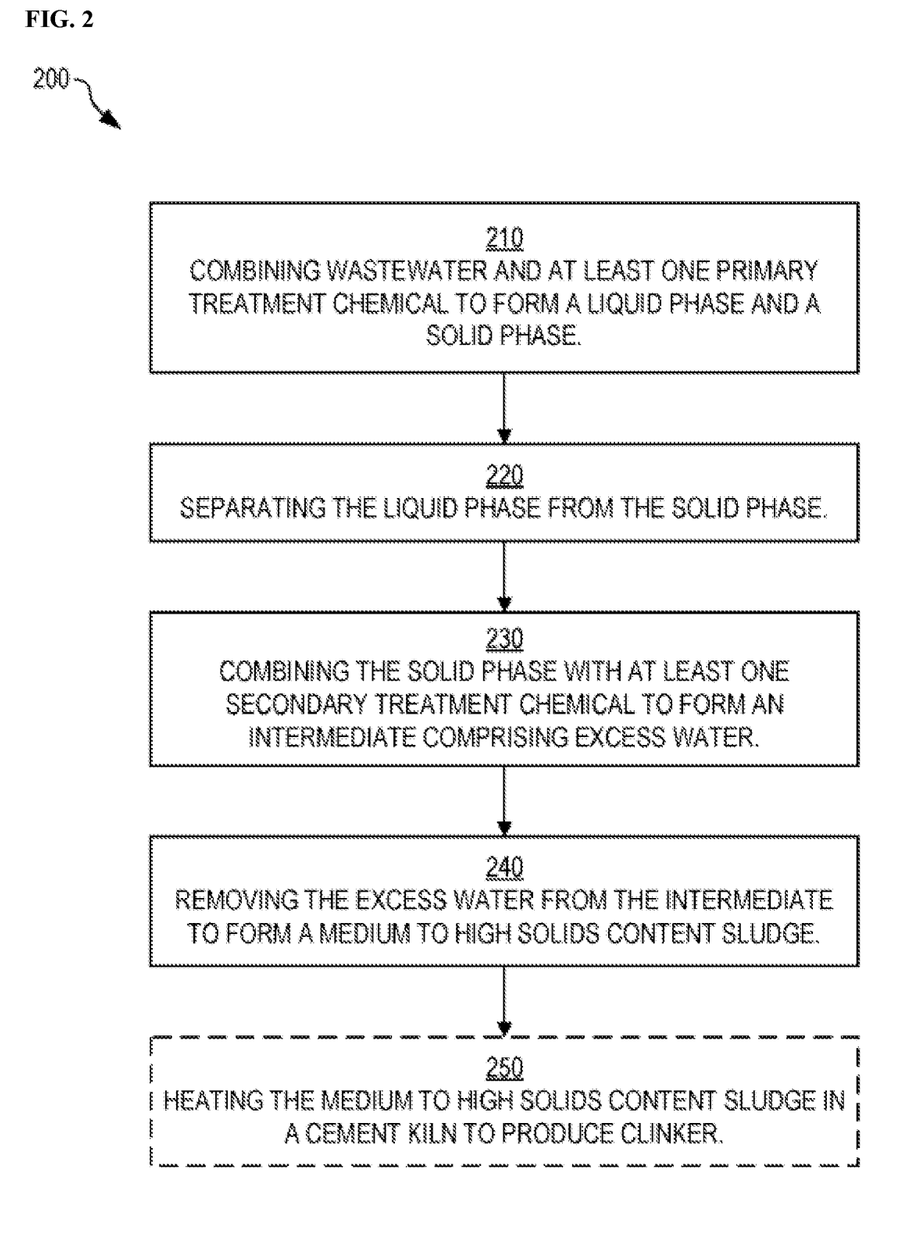
FIG. 2 is a flowchart illustrating an exemplary method for producing sludge for cement manufacturing using Medium to High Solids Content Sludge generated from a wastewater treatment system of FIG. 1.

FIG. 2 is a flowchart illustrating an exemplary method 200 for producing sludge for cement manufacturing using Medium to High Solids Content Sludge generated from wastewater treatment. Method 200 may be used in conjunction with wastewater treatment system 100.

In block 210, wastewater is combined with at least one primary treatment chemical so that a liquid phase and a solid phase are formed. In one example of block 210, wastewater 104 is combined with at least one primary treatment chemical 110 in wastewater phase-separation device 102 to form a liquid phase (i.e., cleaned water 106) and a solid phase (i.e., sludge byproduct 108).

In block 220, the liquid phase is separated from the solid phase. In one example of block 220, clean water 106 may be separated from sludge byproduct 108 by wastewater phase-separation device 102.

In block 230, the solid phase is combined with at least one secondary treatment chemical to form an intermediate that contains excess water. In one example of block 230, sludge byproduct 108 may be combined with at least one secondary treatment chemical 140 in the wastewater dewatering device 130 to form an intermediate that contains excess water 134.

In block 240, the excess water is removed from the intermediate to form a Medium to High Solids Content Sludge. In one example of block 240, the excess water 134 may be removed from the intermediate in the wastewater dewatering device 130 to form the Medium to High Solids Content Sludge 132.

In certain embodiments, the method 200 includes one or more additional blocks of the flowchart in FIG. 2. In block 250, the Medium to High Solids Content Sludge may be heated in a cement kiln to form clinker. In one example of block 250, the Medium to High Solids Content Sludge 132 may be heated in cement kiln 150 to form clinker 152.

In some embodiments, at least one primary treatment chemical of block 210 may be or include one or more of bentonite clay, polymer, silica, calcium hydroxide, aluminum coagulant, ferric sulfate, and iron coagulant.

In certain embodiments, the at least one secondary treatment chemical of block 230 may be or include one or more of bentonite clay, calcium hydroxide, and silica.

Since the method 200 may be used in the wastewater treatment system 100 described previously, the description of respective components of the wastewater treatment system 100 discussed above with respect to FIG. 1 applies to those elements of method 200 with like names. Furthermore, method 200 is not limited, unless otherwise specified or understood by those of ordinary skill in the art, to the order shown in FIG. 2.

This invention can be further illustrated by the following exemplary embodiments thereof, although it will be understood that these examples are included merely for the purposes of illustration and are not intended to limit the scope of the invention unless otherwise specifically indicated.

Exemplary Embodiments

In a first exemplary embodiment, wastewater 104 is derived from a generator wastewater stream, which is sampled and tested to determine levels of primary inorganic constituents, including at least one of calcium, iron, aluminum, and silica, and to determine effective amounts of primary treatment chemical 110 and secondary treatment chemical 140 that are needed for treatment. The analytical profile of the inorganic constituents in the wastewater 104 provides a basis of the necessary flocculant blend (the primary treatment chemical 110 to be added) to be used. Optionally, chemicals may be added for pH adjustment of the wastewater 104.

In a second exemplary embodiment, wastewater 104 is derived from a flexographic ink wastewater stream, which is determined to include iron, aluminum, silica, and calcium. Based on different types of flexographic ink wastewater streams, at least one of aluminum and iron may be present in the highest levels and at least one of silica and calcium is present at lower concentration.

A flexographic wastewater stream may contain less than 2 weight percent of inorganic solids that can be removed through phase separation, e.g., in wastewater phase-separation device 102. Levels of these inorganic constituents (e.g., aluminum, iron, silica, and calcium) in the wastewater stream may be related to the levels of inorganic constituents retained in the sludge byproduct generated in waste treatment system 100. After phase separation in wastewater phase-separation device 102, the sludge byproduct 108 may include about 10 weight percent of aluminum, about 6 to about 8 weight percent of iron, about 2 to about 3 weight percent of calcium, and about 1 to about 2 weight percent of silica, based on the total weight of the solids.

Accordingly, a bentonite clay formula may be used in the wastewater treatment system 100 when processing flexographic ink wastewater. This formula is optimized to target the inorganic constituents present in the highest concentrations, which can allow an efficient phase-separation. Once the resultant sludge byproduct is dewatered in the wastewater dewatering device 130, the resultant Medium to High Solids Content Sludge 132 may contain up to about 50 weight percent aluminum, based on the total weight of the solids.

In yet another exemplary embodiment, wastewater 104 is derived from a metal stamping, fine blanking wastewater stream that includes at least one of iron, aluminum, silica, and calcium. The facility that generates the metal stamping fine blanking wastewater stream dictates what contaminants will be present in the wastewater 104. For example, facilities processing ferrous alloy metals may generate wastewater streams that contain relatively large concentrations of iron, while facilities that process aluminum alloy metals may generate wastewater streams that contain relatively large concentrations of aluminum.

A metal stamping fine blanking wastewater stream may contain less than 2 weight percent inorganic solids capable of removal through phase separation. The level of inorganic constituents (e.g., aluminum, iron, silica, and calcium) in the wastewater 104 may be related to the levels of inorganic constituents retained in the resultant Medium to High Solids Content Sludge 132 generated with the wastewater treatment system 100. It has been determined through analytical profiling that contaminants are frequently found in the following descending weight percent order: aluminum, iron, calcium, and silica.

The amounts of the primary treatment chemical and the secondary treatment chemical used when treating wastewater may be optimized to target, for example, the inorganic constituents with the larger (or, e.g., the largest) weight percentage, which may facilitate successful removal of the contaminants from the wastewater. Once the resultant Medium to High Solids Content Sludge 132 is generated, it may contain up to about 50 weight percent aluminum, based on the total weight of the solids.

The embodiments described herein provide a process for wastewater treatment and sludge disposal which may divert wastewater sludge from landfills to cement kilns for manufacturing cement products. The disclosed processes are a sustainable, efficient, and environmentally sound method for handling wastewater Medium to High Solids Content Sludge, e.g., sold sludge 132. The disclosed method may provide cement kilns, e.g., cement kiln 150, with alternative raw materials for manufacturing cement, eliminating the need for disposal of wastewater sludge and reducing the amount of raw material needed for cement manufacture. Using at least one of the wastewater treatment system 100 and the method for producing sludge 200 for cement manufacturing, the resultant Medium to High Solids Content Sludge 132 may be suitable for cement manufacturing. By matching the abundance of one or more inorganic components within a wastewater stream to the requirements of a cement product, it is possible to minimize the amount of wastewater treatment chemicals and/or pH adjustment chemicals used to treat the wastewater stream and to provide the cement manufacturing process with the highest value raw sludge material.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "about" refers to any value in the range of 90% to 110% of the specified value.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the term "solids" may refer to any particles, particulates, or other shapes that are solid at 25° C. at 1 atm.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

When a numerical sequence is indicated, it is to be understood that each number is modified the same as the first number or last number in the numerical sequence or in the sentence, e.g., each number is "at least," or "less than" as the case may be and each number is in an "or" relationship. For example, "at least 1, 2, 3, 4, or 5 weight percent" means the same as "at least 1 weight percent, or at least 2 weight percent, or at least 3 weight percent, or at least 4 weight percent, or at least 5 weight percent.

Claims Not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method for producing a sustainable clinker, the method comprising:
    (a) combining wastewater and at least one primary treatment chemical to form a multiphasic product comprising a liquid phase and a sludge byproduct, wherein the primary treatment chemical consists of clay, silica, calcium hydroxide, aluminum chlorohydrate, aluminum chloride, aluminum sulfate, ferric sulfate, ferrous chloride, ferrous sulfate, or ferric chloride;
    (b) separating at least a portion of the multiphasic product into the liquid phase and the sludge byproduct;
    (c) treating at least a portion of the sludge byproduct with at least one secondary treatment chemical to form an intermediate comprising excess water, wherein the secondary treatment chemical consists of clay, calcium hydroxide, or silica;
    (d) removing the excess water from the intermediate to form a Medium to High Solids Content Sludge comprising a solids content of 20 to 70 weight percent; and
    (e) forming the sustainable clinker with at least a portion of the Medium to High Solids Content Sludge.

2. The method according to claim 1, wherein the primary treatment chemical consists of bentonite clay, silica, calcium hydroxide, aluminum chlorohydrate, aluminum chloride, or aluminum sulfate.

3. The method according to claim 1, wherein the secondary treatment chemical consists of bentonite clay or silica.

4. The method according to claim 1, wherein the primary treatment chemical and/or the secondary treatment chemical consists of bentonite clay.

5. The method according to claim 1, wherein the wastewater is derived from a flexographic ink facility, a metal stamping facility, a paper manufacturing facility, and/or a die-casting facility.

6. The method according to claim 1, wherein the sludge byproduct comprises a solids content of 1 to 20 weight percent.

7. The method according to claim 1, wherein the sustainable clinker comprises a plurality of solid particulates, wherein at least 75 weight percent of the solid particulates in the sustainable clinker are derived from the Medium to High Solids Content Sludge.

8. The method according to claim 1, wherein the sustainable clinker comprises at least 90 weight percent of one or more inorganic solids.

9. The method according to claim 1, wherein the Medium to High Solids Content Sludge comprises at least 50 to 70 weight percent of one or more inorganic solids.

10. The method according to claim 1, wherein the Medium to High Solids Content Sludge comprises at least 50 to 70 weight percent of one or more aluminum-containing solids.

* * * * *